United States Patent
Leblans et al.

(10) Patent No.: US 6,228,286 B1
(45) Date of Patent: May 8, 2001

(54) CLASS OF HIGH ENERGY DETECTING PHOSPHORS

(75) Inventors: Paul Leblans, Kontich; Peter Willems, Stekene; Luc Struye, Mortsel, all of (BE); Johann-Martin Spaeth; Thomas Pawlik, both of Paderborn (DE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 08/420,562

(22) Filed: Apr. 12, 1995

(30) Foreign Application Priority Data

Jun. 3, 1994 (EP) .................................................. 94201578

(51) Int. Cl.[7] ........................... C09K 11/61; C09K 11/62; C09K 11/74; C09K 11/85; G21K 4/00
(52) U.S. Cl. .................................. 252/301.4 H; 250/362; 250/473.1; 250/484.1
(58) Field of Search .................... 252/301.4 H; 423/463, 423/464; 250/362, 473.1, 484.4

(56) References Cited

PUBLICATIONS

Ryba–Romanowski et al., "Investigation of Emission Spectra and Lifetimes of Cs2NaErCl6 Single Crystals", Jour. Luminescence 27, Aug. 1982, p. 177–89.*
Chem. Abstract 117:100105, Dolan et al. 1992, no month.*
Chem. Abstract 111:68392, Reber et al. 1989, no month.*
Chem. Abstract 76:118306, Cousson et al. 1972, no month.*
Chem Abstract 73:62105, Grannec et al. 1970, no month.*
Aull et al. "Impact of ion–host interactions on the 5d–to–4f spectra of lanthanide rare–earth–metal ions. II. The Ce–doped elpasolites". Phy. Rev. B, vol. 34(1), Nov. 15, 1986, pp. 6647–6655*
Tanner et al. "Analysis of Spectral Data and Comparative Energy Level Parametrizations for Ln3+ in Cubic Elpasolite Crystals". J. Alloys Comp., 215, Nov. 1994, pp. 349–370.*

* cited by examiner

*Primary Examiner*—C. Melissa Koslow
(74) *Attorney, Agent, or Firm*—Breiner & Breiner

(57) ABSTRACT

An elpasolite phosphor is provided corresponding to the general formula:

$$A_{2-y}B_{1+y}Me^{3+}X_6:xD$$

wherein:
A = a monovalent ion
B = a monovalent ion
A is different from B
$Me^{3+}$ = a trivalent ion
D is a dopant
X is at least one of F, Cl, Br and I
$0 \leq y \leq 1$
$0 \leq x \leq 0.2$
and wherein said phosphor has a specific gravity (sg) $\geq 4$.

An elpasolite phosphor corresponding to the general formula above is especially useful in the production of prompt emitting X-ray screens and in the production of X-ray energy storage screens.

15 Claims, 3 Drawing Sheets

CLASS OF HIGH ENERGY DETECTING PHOSPHORS

FIELD OF THE INVENTION

This invention relates to the detection of high energy electromagetic radiation and the detection of high energy particles. In particular this invention relates to a class of compounds that under influence of the absorption of X-rays either directly emit light (luminesce) or store a certain portion of the absorbed X-ray energy. This stored energy can be emitted later on as light. This invention relates also to a method of recording and reproducing an X-ray pattern by means of a binder layer containing a compound of said class in a screen or panel.

BACKGROUND OF THE INVENTION

It is well known that high energy radiation can cause appropriate substances to luminesce. Substances showing the phenomenon of luminescence under the influence of high energy radiation are called phosphors or scintillators.

A well known use of phosphors is in the production of X-ray images. In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

For use in common medical radiography the X-ray film comprises a transparent film support, coated on both sides with a silver halide emulsion layer. During the X-ray irradiation said film is arranged in a cassette between two X-ray conversion screens each of them making contact with its corresponding silver halide emulsion layer.

According to another method of recording and reproducing an X-ray pattern disclosed e.g. in U.S. Pat. No. 3,859,527 a special type of phosphor is used, known as a photostimulable phosphor, which being incorporated in a panel is exposed to incident pattern-wise modulated X-rays and as a result thereof temporarily stores therein energy contained in the X-ray radiation pattern. At some interval after the exposure, a beam of visible or infra-red light scans the panel to stimulate the release of stored energy as light that is detected and converted to sequential electrical signals which are processable to produce a visible image. For this purpose, the phosphor should store as much as possible of the incident X-ray energy and emit as little as possible of the stored energy until stimulated by the scanning beam.

As described in U.S. Pat. No. 4,239,968 europium-doped barium fluorohalides are particularly useful for application as stimulable phosphors for their high sensitivity to stimulating light of a He—Ne laser beam (633 nm), ruby laser beam (694 nm) and YAG laser beam (1064 nm), the optimum of stimulation being in the range of 500 to 700 nm. The light emitted upon stimulation, called stimulated light is situated in the wavelength range of 350 to 450 nm with its main peak at 390 nm (ref. the periodical Radiology, September 1983, p. 834).

As described in said periodical the imaging plate containing the stimulable phosphor can be used repeatedly to store X-ray images simply by flooding it with light to erase the residual energy it contains.

For use as photostimulable phosphors, europium-doped barium fluorohalides as described in, e.g., U.S. Pat. No. 4,239,968, halosilicates or halogermanates as described in, e.g., EP-B 382 295 and alkalimetal/alkaline earth metal halides as described in, e.g., U.S. Pat. No. 5,028,509 are preferred. Each of these classes of compounds do have their own advantage and disadvantages. As can be learned from DE-OS 3,347,207 europium-doped barium fluorohalides are chemically not stable and are more particularly sensitive to moisture which according to experiments affects their fluorescence power.

The trough-put of a digital radiography system, based on the use of storage phosphors, strongly depends on the speed with which the image on the storage phosphor plate can be scanned without adverse effects on image quality. This speed is limited by the decay-time of the stimulated luminescence. The decay-time for the best known and mostly used storage phosphors (e.g. europium-doped barium fluorohalides) is about 500 ns. Therefore the need still exists for storage phosphors with a decay-time that is substantially shorter than 500 ns.

The image quality that is produced by a conventional as well as by a digital radiographic system, mainly depends on the construction of the phosphor screen. Generally, the thinner a phosphor screen at a given amount of absorption of X-rays, the better the image quality. This means that the lower the ratio binder to phosphor of a phosphor screen, the better the image quality, attainable with that screen, will be. Optimum sharpness can thus be obtained when "single crystal" screens (i.e. screens without any binder) are used. Such screen can be produced, e.g., by vacuum deposition of phosphor material on a substrate. However, this production method can not be used to produce high quality screens with every arbitrary phosphor available. The mentioned production method leads to the best results when phosphor crystals with high crystal symmetry are used. Phosphor having complicated crystal structures as, e.g., alkaline earth fluorohalides, tend to decompose (partially) under vacuum deposition and the production of screens by vacuum deposition while using phosphors with complicated crystal structure is quasi impossible and leads to sub-optimal results.

From the above it is clear that the need for a novel class of compounds useful as photostimulable phosphor and that combine the advantages of the prior art phosphors with a lesser degree of disadvantages is still real.

Also in classical radiography various compounds are used as phosphors, but also in this sector the need for new compounds still exists, because in this sector the need for higher speed, i.e. lower X-ray dosis for the patient, combined with high sharpness and low noise continues to exist.

OBJECT AND SUMMARY OF THE INVENTION

It is an object of the invention to provide a novel class of phosphors useful in classical radiography, using luminescent screens as well as in computer radiography, using storage phosphor screens.

It is another object of the invention to provide a novel class of phosphors that combines high speed with high chemical stability and low sensitivity to humidity.

It is still an other object of the invention to provide phosphors that make it easier to produce screens comprising vapour deposited phosphor layers.

It is another object of the invention to provide a method for recording X-rays by exposing a recording element comprising an X-ray intensifying screen (i.e. a screen comprising a prompt emitting phosphor) in combination with a photosensitive material.

It is still a further object of the invention to provide a method for recording X-rays comprising the steps of (i) exposing a photostimulable storage phosphor screen, (ii) stimulating said photostimulable screen to release the stored X-ray energy as stimulated light and (iii) collecting said stimulated light.

Further objects and advantages of the present invention will become clear from the description hereinafter.

The objects of this invention are realised by providing elpasolite phosphors with the general formula:

$$A_{2-y}B_{1+y}Me^{3+}X_6:xD$$

wherein:
A=a monovalent ion
B=a monovalent ion
A is different from B
$Me^{3+}$=a trivalent ion
D is a dopant
X is at least one of F, Cl, Br and I
$0 \leq y \leq 1$
$0 \leq x \leq 0.2$
and wherein said phosphor has a specific gravity (sg)$\geq 4$.

In a further preferred embodiment A is either Cs, Rb, K or Tl B an alkalimetal different from A and $Me^{3+}$ is a member selected from the group consisting of Sc, Lu, La, Y, Gd, Tl, In and Bi and the dopant D is a member selected from the group consisting of Sb, Cu, Ce, Ga, In, Tl, Na and Eu.

DETAILED DESCRIPTION OF THE INVENTION

Figure 1:
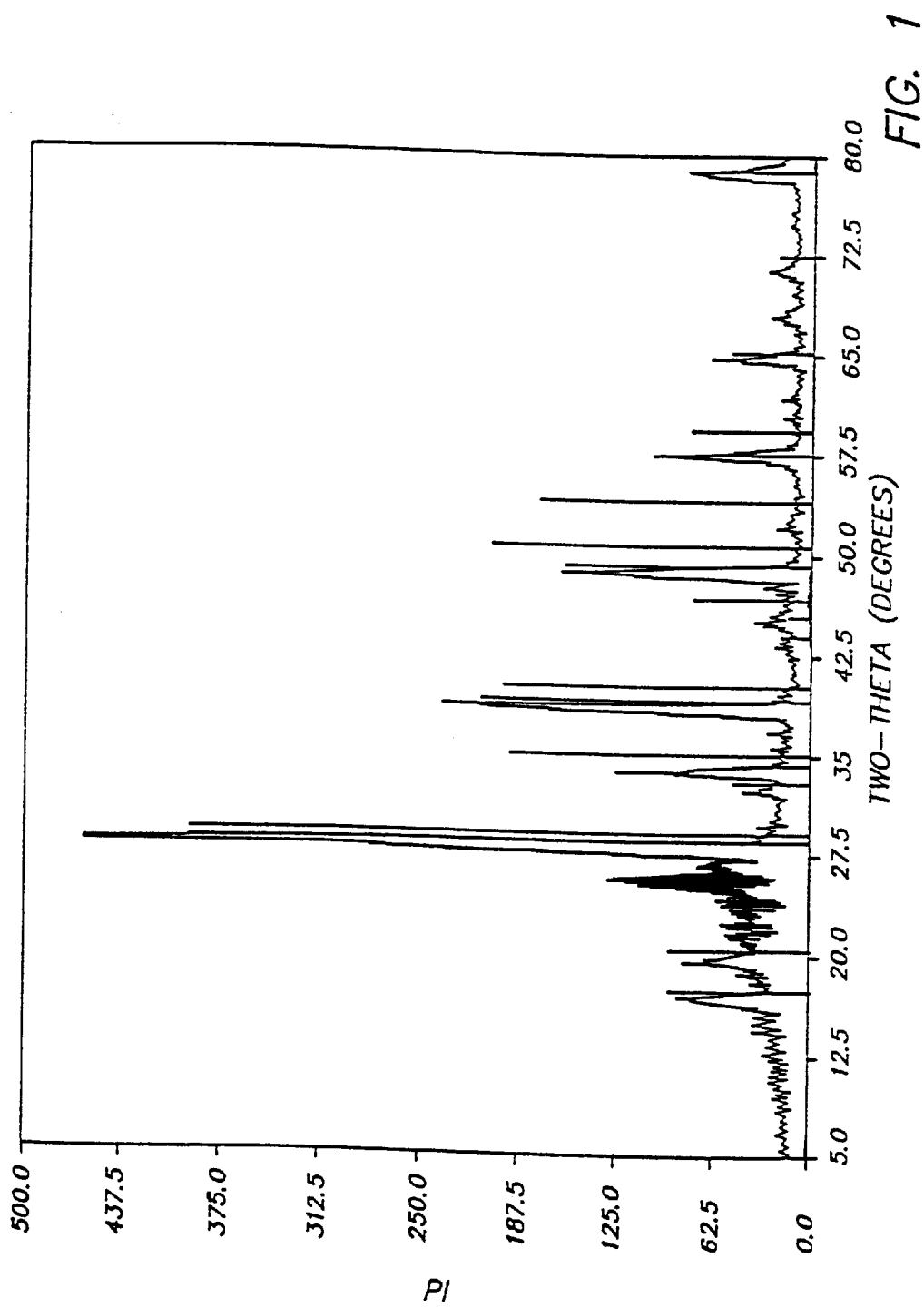
FIG. 1 represents the X-ray diffraction spectrum of a compound according to the present invention.

It has been found that "elpasolites", with the cited general formula are useful as phosphors. These elpasolites are prompt emitting phosphors (i.e. luminesce due to absorption of X-ray energy) as well as storage phosphors (i.e. are capable of storing at least a part of the absorbed X-ray energy and releasing said energy upon stimulation by light as light with a lower wavelength than the stimulation light).

Hereinafter "phosphor" stands for prompt emitting phosphor as well as for storage phosphor as well as for compounds that are scintillators under influence of high energy particles.

In this document the term "X-ray" has to be understood as all penetrating radiation and includes i.a. radiation originating from a radioisotope (e.g. a Co60 source), radiation created by an X-ray generator of any type, radiation and high energy particles created by a high energy radiation generator (e.g. Betatron), radiation from a sample labeled with a radioisotope as is the case in e.g. autoradiography.

The crystallography of elpasolites is related to the better known perovskites. Data on the crystallography of elpasolites can be found in teh book "Inorganic Solid Fluorides" Paul Hagen muller, Ed. in Materials Science Series, Academic Press London, 1985 (ISBN 0-12-313370-X). Cubic elpasolites are adressed on page 111 of the above mentioned book, distorted elpasolites on page 112 and hexagonal elpasolites on page 117 of said book.

The general formula of the elpasolites, useful according to the present invention is:

$$A_{2-y}B_{1+y}Me^{3+}X_6:xD$$

wherein:
A=a monovalent ion
B=a monoalent ion
A is different from B
$Me^{3+}$=a trivalent ion
D is a dopant
X is at least one of F, Cl, Br and I
$0 \leq y \leq 1$
$0 \leq x \leq 0.2$ Elpasolites can, depending on the ionic radii of the various ions composing the compound, crystallize in various crystalline systems. Cubic, triclinic and hexagonal elpasolites are known. Elpasolites crystallized in any crystalline system are useful for the present invention. In a preferred embodiment $r_A > r_B > r_{Me^{3+}}$, wherein $r_A$ represents the ionic radius of monovalent metal ion A, $r_B$ the ionic radius of monovalent metal ion B and $r_{Me}^{3+}$ the ionic radius of the trivalent metal ion $Me^{3+}$.

Independent of crystal habit or ionic radii of the composing ions, elpasolites, useful in the present invention, have preferably a specific gravity equal to or larger than 4, more preferably larger than 5.

In a further preferred embodiment A represents either Cs, Rb, K or Tl and B represent either Rb, K and Na and the combination of A and B is chosen such that A and B are different and that $r_A > r_B$.

In the most preferred embodiment A represents either Cs, Rb, K or Tl and B represent either Rb, K and Na, the combination of A and B is chosen such that A and B are different and $r_A > r_B$ and $Me^{3+}$ is a member selected from the group consisting of Sc, Lu, La, Y, Gd, Tl, In and Bi.

The wavelength of the prompt emission and/or of the stimulated emission can be chosen by using different dopants D. Any dopant known in the art of the manufacture of prompt emitting and stimulable phosphors, can be used in the phosphors according to the present invention. It is however, preferred to use, in a phosphor according to the present invention, a dopant D selected from the group consisting of Sb, Cu, Ce, In, Tl, Na and Eu. More preferably the dopant D is a member selected from the group consisting of Ce, In, Tl and Eu.

In a phosphor according to the present invention any halogen or mixture of halogens can be used as X. In a preferred embodiment of the invention, hexafluorides, hexabromides and mixtures of fluorine, bromine, and iodine are used.

The elpasolite phosphors according to the present invention can be produced according to any way known in the art, starting from phosphor precursors, e.g. oxides, carbonates, sulfonates, halides, phosphates, nitrates, oxalates, lactates, acetylacetonates, malonates, phthalates, alkoxides, phenoxides or ethylenediamine derivatives of the metalions that are to be incorporated in the phosphor. These phosphor precursors are mixed in the appropriate stoechiometric proportions and are then heated for a given time. After cooling, the sintered block of phosphor is milled into fine phosphor particles. The milling operation continues until phosphor particles with the appropriate average particle size and size distribution. During the preparation of the phosphor any known flux materials can be added to the reaction mixture. Flux materials useful for use in the preparation of the phophors according to the invention are, e.g., halides, metasilicates of alkali metals or alkaline earth metals. A very useful and preferred method for the preparation of elpasolites according to the present invention can be found in Research Disclosure Volume 358, February 1994 p 93 item 35841, that is incorporated herein by reference.

An other useful method for preparation of elpasolites according to this invention can be found in U.S. Pat. No. 5,154,360.

The average grain size of said elpasolite-phosphors is preferably in the range of 2 to 25 $\mu$m, more preferably in the range of 3 to 15 $\mu$m.

The elpasolites according to this invention can be used to form a radiographic screen or panel. It is possible to use the elpasolites according to the present invention either alone or mixed with one or more other phosphors. Mixtures of elpasolites and other phosphors can be useful to fine-tune the quality of the screen (e.g. sharpness, noise, speed, etc).

The radiographic screen or panel can be either self supporting or can comprises a mixture of the elpasolite-phosphor and a binder, coated on a support.

Any binder known in the art can be used to form a screen or panel comprising an elpasolite-phosphor according to the present invention. Suitable binders are, e.g., gelatin, polysaccharides such as dextran, gum arabic, and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate, cellulose acetate butyrate, polyvinyl alcohol, polystyrene, polyester, etc. These and other useful binders are disclosed e.g. in U.S. Pat. Nos. 2,502,529, 2,887,379, 3,617,285, 3,300,310, 3,300,311 and 3,743,833.

A mixture of two or more of these binders may be used, e.g., a mixture of polyethyl acrylate and cellulose acetobutyrate.

The weight ratio of phosphor to binder is generally within the range of from 50:50 to 99:1, preferably from 80:20 to 99:1. Preferably a self-supporting or supported layer of elpasolite-phosphor particles according to the present invention comprises said particles dispersed in a binding medium and a protective coating thereover characterised in that the binding medium substantially consists of one or more hydrogenated styrene-diene block copolymers, having a saturated rubber block, as rubbery and/or elastomeric polymers. The polymer can be represented by the formula A—B—A (tri-block) or by the formula A—B (di-block), wherein A represents styrene and B represents the hydrogenated diene block e.g. ethylene-butylene or ethylene-propylene.

Further the ratio by volume of phoshor to binding medium is referably more than 70/30 and still more preferably more than 85/15.

The coating weight of elpasolite-phosphor particles can be adapted to the desired speed of the radiographic screen or panel, but preferably a coating weight between 5 and 250 mg/cm$^2$, most preferably between 20 and 175 mg/cm$^2$, is used.

By said hydrogenated diene copolymers, for use as rubbery and/or elastomeric polymers, the phosphor layer has improved elasticity of the screen, high protection against mechanical damage and thus high ease of manipulation and allow high pigment to binder ratio without getting deteriorated by ageing after frequent reuse.

Particularly suitable thermoplastic rubbers, used as block-copolymeric binders in phosphor screens in accordance with this invention are the KRATON-G rubbers, KRATON being a trade mark name from SHELL. KRATON-G thermoplastic rubber polymers are a unique class of rubbers designed for use without vulcanisation. In the published report KR.G.2.1 (INTERACT/7641/2m/1186 GP KRA/ENG) wherein a description of KRATON-G rubbers is given, the KRATON-G 1600 series rubbers are presented as block copolymers in which the elastomeric midblock of the molecule is a saturated olefin rubber. KRATON-G 1600 series rubbers are described to possess excellent resistance to degradation by oxygen, ozone and UV light and they also have high cohesive strength and retain their structural integrity at elevated temperatures.

A radiographic screen or panel comprising elpasolites according to the present invention can be prepared by the following manufacturing process.

The phosphor layer can be applied to the support by any coating procedure, making use of solvents for the binder of the phosphor containing layer as well as of useful dispersing agents, useful plasticizers, useful fillers and subbing or interlayer layer compositions that have been described in extenso in EP-A 0 510 753 and in the corresponding U.S. Ser. No. 07/871,328, now U.S. Pat. No. 6,120,902.

Elpasolite-phosphor particles, according to the present invention, are mixed with the dissolved rubbery polymer, in a suitable mixing ratio to prepare a dispersion. Said dispersion is uniformly applied to a substrate by a known coating technique, e.g. doctor blade coating, roll coating, gravure coating or wire bar coating, and dried to form a luminescent layer fluorescing by X-ray irradiation and called hereinafter fluorescent layer.

Examples of preferably used solvents, also with a view to phosphor recovery purposes from worn-out screens, requiring the phosphor containing layer to be soluble and to remain soluble after coating, include lower alcohols such as methanol, ethanol, n-propanol and n-butanol; chlorinated hydrocarbons such as methylene chloride and ethylene chloride; ketones such as acetone, butanone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether; methyl glycol; and mixtures of the above-mentioned solvents. Particularly preferred in combination with ethyl acetate as a preferred ester is toluene as an aromatic solvent used to solve the thermoplastic rubbers, present as solid flakes.

Useful plasticizers include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; polymeric plastizers, e.g. and polyesters of polyethylene glycols with aliphatic dicarboxylic acids such as polyester of triethylene glycol with adipic acid and polyester of diethylene glycol with succinic acid.

The coating dispersion may contain a filler (reflecting or absorbing) or may be colored by a colorant capable of absorbing light within the spectrum emitted by the phosphor or capable of absorbing excitation light in the case of a stimulable X-ray conversion screen. Examples of colorants include Solvent Orange 71 (Diaresin Red 7), Solvent Violet 32 (Diaresin Violet A), Solvent Yellow 103 (Diaresin Yellow C) and Solvent Green 20 (all four supplied by Mitsubishi Chemical Industries, Japan), Makrolex Rot GS, Makrolex Rot EG, Makrolex Rot E2G, Helioechtgelb 4G and Helioechtgelb HRN (all five marketed by Bayer, Leverkusen, Germany), Neozaponfeuerrot G and Zaponechtbraun BE (both marketed by BASF, Ludwigshafen, W. Germany). Colorants useful in screens or panels using an elpasolite phosphor according to this invention are described in, e.g. U.S. Pat. Nos. 3,883,747, 4,259,588 and 4,394,581.

Useful dispersing agents for the phosphor particles in the coating dispersion to improve the dispersibility of the phosphor particles therein, may contain a variety of additives such as a plasticizer for increasing the bonding between the binder and the phosphor particles in the phosphor layer. Examples of the dispersing agent include ionic and nonionic well-known dispersing agents or combinations thereof, e.g., GAFAC RM 610 (tradename) a polyoxyethylene (20) sorbitan monopalmitate and monolaurate marketed by General Aniline and Film Company (GAF), New York, USA, polymeric surfactants such as the acrylic graft copolymer, PHOSPHOLIPON 90 (tradename) marketed by Nattermann-Phospholipid GmbH, Köln, W. Germany, silane dispersing agents and surfactants e.g. DOW CORNING 190 (tradename) and SILANE Z6040 (tradename) marketed by Dow Corning Corporation, Midland, Mich., USA or glymo 3-glycidyloxypropylmethoxysilane or organosulfate polysilanes, unsaturated p-aminamide salts and high molecular acid esters such as ANTI TERRA U 80 (tradename) marketed by BYK-Chemie GmbH, Wesel, W. Germany, high molecular unsaturated polyesters, etc. Dispersing agents are added in an amount of 0.05 to 10% by weight based on the phosphor. Particularly suited dispersing agents are modified thermoplastic acrylics, such as DISPERSE AYD 9100 (Trade name of Daniel Products, Jersey City, N.J., USA). These dispersing agents improve not only the dispersion properties of the phosphor particles in the binder, but also the adhesion of the coated phosphor/binder mixture to the support of the screen or panel. The use of these dispersing agents is particularly beneficial when used in combination with thermoplastic binder materials as e.g. KRATON-G rubbers, KRATON being a trade mark name from SHELL.

In the preparation of a radiographic screen, one or more additional layers are occasionally provided between the support and the phosphor containing layer, having subbing- or interlayer compositions, so as to improve the bonding between the support and the phosphor layer, or to improve the sensitivity of the screen or the sharpness and resolution of an image provided thereby. For instance, a subbing layer or an adhesive layer may be provided by coating polymer material, e.g., gelatin, a polyester cross-linked by a reaction with a tri-isocyanate or a polyester with only terminal hydroxyl groups, the chain length of which has been increased by the reaction of said terminal hydroxyl groups and a di-isocyanate, over the surface of the support on the phosphor layer side. Said subbing layer may contain also modified thermoplastic acrylic resins such as those described above to improve the adhesion properties of the subbing layers.

A light-reflecting layer may be provided, e.g. by vacuum-depositing an aluminium layer or by coating a pigment-binder layer wherein the pigment is e.g. titanium dioxide. For the manufacture of light-absorbing layer, serving as anti-halation layer, carbon black dispersed in a binder may be used but also any known anti-halation dye. Such additional layer(s) may be coated on the support either as a backing layer or interposed between the support and the phosphor containing layer(s). Several of said additional layers may be applied in combination.

Radiographic screens, also those using elpasolites according to the present invention as prompt emitting conventional phosphors, can also be made in the form of gradual screens, i.e. screens having a gradual intensification along their length and/or width. Graduality can be achieved by gradually increasing the thickness of the phosphor layer over the length or width of the screen or by incorporating into the protective layer or into an interlayer between the protective layer and phosphor containing layer a gradually increasing amount of dye capable of absorbing the light emitted by the phosphor.

According to another convenient technique graduality is obtained by halftone printing of a dye or ink composition absorbing the light emitted by the screen. By varying the screen dot size in the halftone print, i.e. by gradually varying the percent dot area over the length or width of the screen graduality can be obtained in any degree. The halftone printing can proceed on the phosphor containing layer which thereupon is covered with the protective coating or proceeds by applying the protective coating by halftone printing, e.g. by gravure roller or silk screen printing.

In an other embodiment graduality in radiographic screens using elpasolites according to the present invention (as well as in other phosphor screens) can be obtained by coating a phosphor/binder mixture on top of a reflecting support carrying an exposed and developed halftone image that gradually diminishes the reflection of the light emitted by the phosphor.

Said halftone image can be exposed onto an halftone recording medium, especially a silver halide material and can have any form necessary to achieve the desired graduality in the screen.

In the preparation of the phosphor screen having a primer layer between the substrate and the fluorescent layer, the primer layer is provided on the substrate beforehand, and then the phosphor dispersion is applied to the primer layer and dried to form the fluorescent layer.

After applying the coating dispersion onto the support, the coating dispersion is heated slowly to dryness so as to complete the formation of a phosphor layer. In order to remove as much as possible entrapped air in the phosphor coating composition it can be subjected to an ultra-sonic treatment before coating. Another method to reduce the amount of entrapped air consists in a compression method as has been described in EP-A 393 662 wherein the said compression is preferably carried out at a temperature not lower than the softening point or melting point of the rubbery binder to improve the phosphor packing density in the dried layer.

In order to avoid electrostatic discharges during manufacture of the screen, especially during the coating procedure, conductive compounds can be added to the phosphor/binder mixture or the support can be provided with a conductive layer (lateral resistance $<10^{12}$ $\Omega$/square) on that side of the support opposite to the side to be coated with the phosphor/binder mixture. By this procedure electronic discharges are avoided and the homogeneity of the coating enhanced. Especially when coating a phosphor/binder mixture comprising KRATON (trade name of SHELL), the use of a conductive compound proves beneficial. The conductive compounds used can be of any type known in the art, and useful compounds are described in e.g. EP-A 274 126 and U.S. Pat. No. 4,855,191. Other useful compounds are LANCOSTAT K100 and LANCOSTAT L80 (Lancostat K100 and L80 are trade names of Cray Valley Inc. USA).

If necessary after coating the phosphor/binder mixture the conductive layer on the side of the support opposite to the phosphor/binder mixture layer, may be covered by a plastic sheet or web material. This procedure allows the coating of the phosphor/binder mixture on a thin support (thickness <200 μm). To reinforce the rigidity of the finished screen a supplemental plastic layer (thickness between 100 and 400 μm) is laminated, by the known techniques on to the side of the support opposite to the phosphor/binder mixture layer.

After the formation of the fluorescent layer, a protective layer is generally provided on top of the fluorescent layer. The protective coating composition can be applied as described e.g. in U.S. Pat. No. 4,059,768.

The roughness of the topcoat layer of the intensifying screens offers the advantage that sticking phenomena between a film and an intensifying screen(s) in a cassette are substantially avoided even after intimate contact due to pressure build-up in the cassette system.

Correlating features of roughness and thickness of the protective coating conferring to the screens of the present invention desirable and unexpected properties of ease of manipulation and excellent image sharpness have been described in the EP-Application No. 510 754 and in the corresponding U.S. Ser. No. 07/871,553, now abandoned.

With regard to transport characteristics of a film in a cassette the use of an X-ray conversion phosphor screen having a topcoat with embossed structure favours its practically frictionless loading and unloading of a cassette and reduces considerably the build-up of static electricity. The micro-channels formed by the embossed structure of the protective coating allow air to escape between phosphor screen and contacting film whereby image quality (image sharpness) is improved by better screen-film-screen contact without large air bubble inclusions.

According to a preferred embodiment the coating of the protective layer here proceeds by screen-printing (silk-screen printing).

In a preferred embodiment the protective coating composition is applied by a rotary screen printing device as has been described in detail in EP-Application No. 510 753.

Very useful radiation curable compositions for forming a protective coating contain as primary components:

(1) a crosslinkable prepolymer or oligomer, (2) a reactive diluent monomer, and in the case of an UV curable formulation (3) a photoinitiator.

Examples of suitable prepolymers for use in a radiation-curable composition applied on the phosphor layer according to the present invention are the following: unsaturated polyesters, e.g. polyester acrylates; urethane modified unsaturated polyesters, e.g. urethane-polyester acrylates. Liquid polyesters having an acrylic group as a terminal group, e.g. saturated copolyesters which have been provided with acryl-type end groups are described in published EP-A 207 257 and Radiat. Phys. Chem., Vol. 33, No. 5, 443–450 (1989). The latter liquid copolyesters are substantially free from low molecular weight, unsaturated monomers and other volatile substances and are of very low toxicity (ref. the journal Adhäsion 1990 Heft 12, page 12). The preparation of a large variety of radiation-curable acrylic polyesters is given in German Offenlegungsschrift No. 2838691. Mixtures of two or more of said prepolymers may be used. A survey of UV-curable coating compositions is given e.g. in the journal "Coating" 9/88, p. 348–353.

When the radiation-curing is carried out with ultraviolet radiation (UV), a photoinitiator is present in the coating composition to serve as a catalyst to initiate the polymerization of the monomers and their optional cross-linking with the pre-polymers resulting in curing of the coated protective layer composition. A photosensitizer for accelerating the effect of the photoinitiator may be present. Photoinitiators suitable for use in UV-curable coating compositions belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethylbenzoate; acetophenone series compounds such as acetophenone, trichloroacetophenone, 1,1-dichloroacetophenone, 2,2-diethoxyacetophenone, 2,2-dimethoxy-2-phenylacetophenone; thioxanthone series compounds such as 2-chlorothioxanthone, 2-ethylthioxanthone; and compounds such as 2-hydroxy-2-methylpropiophenone, 2-hydroxy-4'-isopropyl-2-methylpropiophenone, 1-hydroxycyclohexylphenylketone; etc.

A particularly preferred photoinitiator is 2-hydroxy-2-methyl-1-phenyl-propan-1-one which product is marketed by E. Merck, Darmstadt, Germany under the tradename DAROCUR 1173. The above mentioned photopolymerization initiators may be used alone or as a mixture of two or more. Examples of suitable photosensitizers are particular aromatic amino compounds as described e.g. in GB-P 1,314,556, 1,486,911, U.S. Pat. No. 4,255,513 and merocyanine and carbostyril compounds as described in U.S. Pat. No. 4,282,309.

To the radiation-curable coating composition there may be added a storage stabilizer, a colorant, and other additives, and then dissolved or dispersed therein to prepare the coating liquid for the protective layer. Examples of colorants that can be used in the protective layer include MAKROLEX ROT EG, MAKROLEX ROT GS and MAKROLEX ROT E2G. MAKROLEX is a registered tradename of Bayer AG, Leverkusen, Germany.

When using ultraviolet radiation as curing source the photoinitiator which needs to be added to the coating solution will to a more or less extent also absorb the light emitted by the phosphor thereby impairing the sensitivity of the radiographic screen, particularly when a phosphor emitting UV or blue light is used. In case of use of a green emitting phosphor a photoinitiator has to be chosen of which the absorption range overlaps to a minimum degree with the emission range of the phosphor; a preferred photoinitiator is then DAROCUR 1173 (tradename).

The protective coating of the present luminescent article is given an embossed structure following the coating stage by passing the uncured or slightly cured coating through the nip of pressure rollers wherein the roller contacting said coating has a micro-relief structure, e.g. giving the coating an embossed structure so as to obtain relief parts. A suitable process for forming a textured structure in a plastic coating by means of engraved chill roll is described in U.S. Pat. No. 3,959,546.

According to another embodiment the textured or embossed structure is obtained already in the coating stage by applying the paste-like coating composition with a gravure roller or screen printing device operating with a radiation-curable liquid coating composition the Hoeppler-viscosity of which at a coating temperature of 25° C. is between 450 and 20,000 mPa.s. To avoid flattening of the embossed structure under the influence of gravitation, viscosity and surface shear the radiation-curing is effected immediately or almost immediately after the application of the liquid coating. The rheologic behaviour or flow characteristics of the radiation-curable coating composition can be controlled by means of so-called flowing agents. For that purpose alkylacrylate ester copolymers containing lower alkyl (C1–C2) and higher alkyl (C6–C18) ester groups can be used as shear controlling agents lowering the viscosity. The addition of pigments such as colloidal silica raises the viscosity.

A variety of other optional compounds can be included in the radiation-curable coating composition of the present radiographic article such as compounds to reduce static electrical charge accumulation, plasticizers, matting agents, lubricants, defoamers and the like as has been described in the EP-Application 510 753. In said document a description has also been given of the apparatus and methods for curing, as well as a non-limitative survey of X-ray conversion screen phosphors, of photostimulable phosphors and of binders of the phosphor containing layer.

The cured protective layer can also comprise phosphor particles. In doing so the speed/sharpness relation and the SNR (signal to noise ratio) of the screen can be improved.

The edges of the screen, being especially vulnerable by multiple manipulation, may be reinforced by covering the edges (side surfaces) with a polymer material being formed essentially from a moisture-hardened polymer composition prepared according to EP-Application No. 541 146 or the corresponding U.S. Ser. No. 7/963,999, now abandoned, by a process comprising the steps of:

(I) mixing in at least one solvent following components (A) and (B):
  (A) 30 to 99 parts by weight of at least one copolymer of olefinically unsaturated compounds having a weight-average molecular weight [Mw] of at least 1500 and containing chemically incorporated moieties capable of undergoing an addition reaction with amino groups, and
  (B) 1 to 70 parts by weight of organic substances containing blocked amino groups from which substances under the influence of moisture compounds having free primary and/or secondary amino groups are formed, wherein (i) the copolymers of component (A) contain intramolecularly bound carboxylic anhydride moieties, with the anhydride equivalent weight of the copolymers being from 393 to 9,800, and the binder composition contains from 0.25 to 10 anhydride moieties for each blocked amino group,
(II) coating the obtained mixture onto at least one side surface (edge) of said fluorescent screen, and
(III) allowing moisture ($H_2O$) to come into contact with the coated mixture essentially consisting of the above defined components (A) and (B).

An other very useful way to reinforce of the edges of a screen or panel, also those comprising elpasolites according to the present invention, is to coat the edges with a polymeric composition comprising polyvinylacetate, crotonic acid and isocyanates. Preferably a copolymer of vinylacetate and crotonic acid (e.g. MOWILITH CT5, a trade name of Hoechts AG, Frankfurt, Germany) is used in combination with isocyanates.

Support materials for radiographic screens in accordance with the present invention include cardboard, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A plastic film is preferably employed as the support material.

The plastic film may contain a light-absorbing material such as carbon black, or may contain a light-reflecting material such as titanium dioxide or barium sulfate. The former is appropriate for preparing a high-resolution type radiographic screen, while the latter is appropriate for preparing a high-sensitivity type radiographic screen.

Examples of preferred supports include polyethylene terephthalate, clear or blue colored or black colored (e.g., LUMIRROR C, type X30, (trade name) supplied by Toray Industries, Tokyo, Japan), polyethylene terephthalate filled with $TiO_2$ or with $BaSO_4$. Metals as e.g. aluminum, bismuth and the like may be deposited e.g. by vaporization techniques to get a polyester support having radiation-reflective properties.

These supports may have thicknesses which may differ depending on the material of the support, and may generally be between 60 and 1000 $\mu$m, more preferably between 80 and 500 $\mu$m from the standpoint of handling.

A screen or panel comprising an elpasolite-phosphor according to the present invention can carry an antistatic layer either on top of a protective layer or on the side of the support opposite to the side carrying said elpasolite-phosphor. Said antistatic layer may comprises inorganic antistatic agents, e.g. metaloxides as disclosed in, e.g., EP-A 0 579 016 aswell as organic antistatic agents (polyethylene oxides, poly(ethylenedioxythiophene) as disclosed in, e.g., EP-A 0 440 957.

The determination of the properties of panels or screens comprising an elpasolite-phosphor according to the present invention proceeded trough following measurements:

First the "prompt" emission spectrum of the phosphor under X-ray excitation was measured (measurement A). The measurement proceeds with a multichannel detector under excitation by X-ray irradiation and was carried out with an X-ray source operating at room temperature at 80 kVp and 15 mA. Under continuous X-ray excitation light of different wavelengths were produced. The rays of emission light, having different wavelengths, were collected and amplified in the different channels of the multichannel detector.

This emission spectrum was identical to that obtained upon photostimulation and was used to determine which filters are to be used in all the other measurements. A first filter transmits the emitted light obtained by photostimulation but filters out almost all of the stimulating light. For He—Ne laser (633 nm) stimulation a 5 mm HOJA B390 (tradename) filter was used. For the frequency doubled Nd:YAG laser (532 nm) stimulation a 3 mm Schott BG 35 mm (tradename) filter was used, whose transmission spectra are described in the HOYA Color Filter Glass Catalogue No. 8503E published by the HOYA Corporation, Tokyo, Japan.

In the second measurement the total photostimulable energy stored upon exposure to a given X-ray dose was determined (measurement B). This property is expressed as "conversion efficiency (C.E.).

Prior to X-ray excitation any residual energy still present in the phosphor screen was removed by irradiation with light of a 500 W quartz-halogen lamp. The phosphor screen was then excited with an X-ray source operating at 85 kVp and 20 mA. For that purpose the NANOPHOS (tradename) X-ray source of Siemens AG—W. Germany was used. The low energy X-rays are filtered out with a 21 mm thick aluminium plate to harden the X-ray spectrum. After X-ray excitation the phosphor screen was transferred in the dark to the measurement setup. In this setup laser light was used to photostimulate the X-ray irradiated phosphor screen. The laser used in this measurement was either a He—Ne laser (632 nm) or a frequency doubled Nd:YAG laser (532 nm).

The laser-optics comprise an electronic shutter, a beam-expander and two filters. A photomultiplier (Hamamatsu R 1398) collects the light emitted by the photostimulation and gives a corresponding electrical current. The measurement procedure was controlled by a Hewlett Packard HP 382

(tradename) computer connected to a HP 6944 (tradename) multiprogrammer. After amplification with a current to voltage converter a TEKTRONIX TDS 420 (tradename) digital oscilloscope visualizes the photocurrent obtained. When the electronic shutter was opened the laser beam begins to stimulate the phosphor screen and the digital oscilloscope was triggered. Using a diaphragm placed in contact with the screen the light emitted by only 7 mm² was collected. Only half of the laser power (6 mW for the He—Ne laser or 55 mW for the frequency doubled Nd-YAG laser) reaches the screen surface. In this way the intensity of the stimulating beam was more uniform. A red filter (3 mm SCHOTT OG 590, tradename) placed immediately in front of the He-Ne laser eliminates the weak ultraviolet components in the laser emission. The signal amplitude from the photomultiplier is linear with the intensity of the photostimulating light and with the stored photostimulable energy. The signal decreases with time. When the signal curve was entered the oscilloscope was triggered a second time to measure the offset which was defined as the component of error that was constant and independent of inputs. After subtracting this offset the point at which the signal reaches 1/e of the maximum value was calculated. The integral below the curve was then calculated from the start to this 1/e point. The function was described mathematically by $f(t) = A \cdot e^{-t/\tau}$:

wherein A is the amplitude, $\tau$ is the time constant, t is stimulation time, and e is the base number of natural logarithms.

The 1/e point is reached when $t=\tau$ at which 63% of the stored energy has been released. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated. Because the emission light is scattered in all directions only a fraction of the emitted light is detected by the photomultiplier. The position of the panel and photomultiplier are such that 10% of the total emission was detected by the photomultiplier. After all these corrections have been made a conversion efficiency value (C.E.) was obtained in pJ/mm³/mR. This value varies with screen thickness and therefore for measurements to be comparable they have to be carried out at constant phosphor coverage. The stimulation energy was defined as the energy necessary to stimulate 63% of the stored energy and was expressed in $\mu J/mm^2$. This value is obtained by multiplying the time to reach the 1/e emission intensity value by the stimulating intensity.

In a third measurement the response time of the phosphor was determined (measurement C). The phosphor screen was excited or stimulated by short light pulses produced by an nanosecond flash lamp, having a decay-time of 5 ns. The light emitted by the phosphor upon said excitation was measured as a function of time after pulse exitation with light of 306 nm. The response time was taken as the time to reach 1/e (e is the base number of natural logarithms) of the maximum intensity of the emitted light.

Afterwards the sample was irradiated with X-rays. It was stimulated with a 500 nm wavelength pulse of the nanosecond flash lamp. The emitted stimulated light intensity (PSL intensity) was measured as a function of time after the pulse stimulation. The response time was taken as the time to reach 1/e (e is the base number of natural logarithms) of the maximum intensity of the photostimulated luminescence.

In a fourth measurement the stimulation spectrum was determined (measurement D). The light of a tungsten (quartz-iodine) lamp was fed into a monochromator (Bausch and Lomb—W. Germany) and then mechanically chopped with a rotating wheel with a single hole. The lamp provides a continuous spectrum extending from the near UV through the visible spectrum into the infrared. The 33-86-02 grating from Bausch and Lomb was a 1350 line/mm grating covering the visible range from 350 nm to 800 nm in the first order and was blazed at 500 nm. The wavelength of the stimulating light can be set via a step motor connected to the monochromator under the control of a computer. The second harmonic of the monochromator was eliminated by placing a 4 mm Schott GG435 filter in front of the phosphor screen. By chopping the stimulating light (duty cycle 1/200) only a small fraction of the absorbed energy in the phosphor was released. Only the AC signal was measured to eliminate the offset caused due to e.g. the dark current of the photomultiplier. A good signal to noise ratio was obtained by averaging several pulses. Upon completing the measurement the computer corrects the curve for the intensity wavelength dependence of the tungsten lamp.

Figure 2:
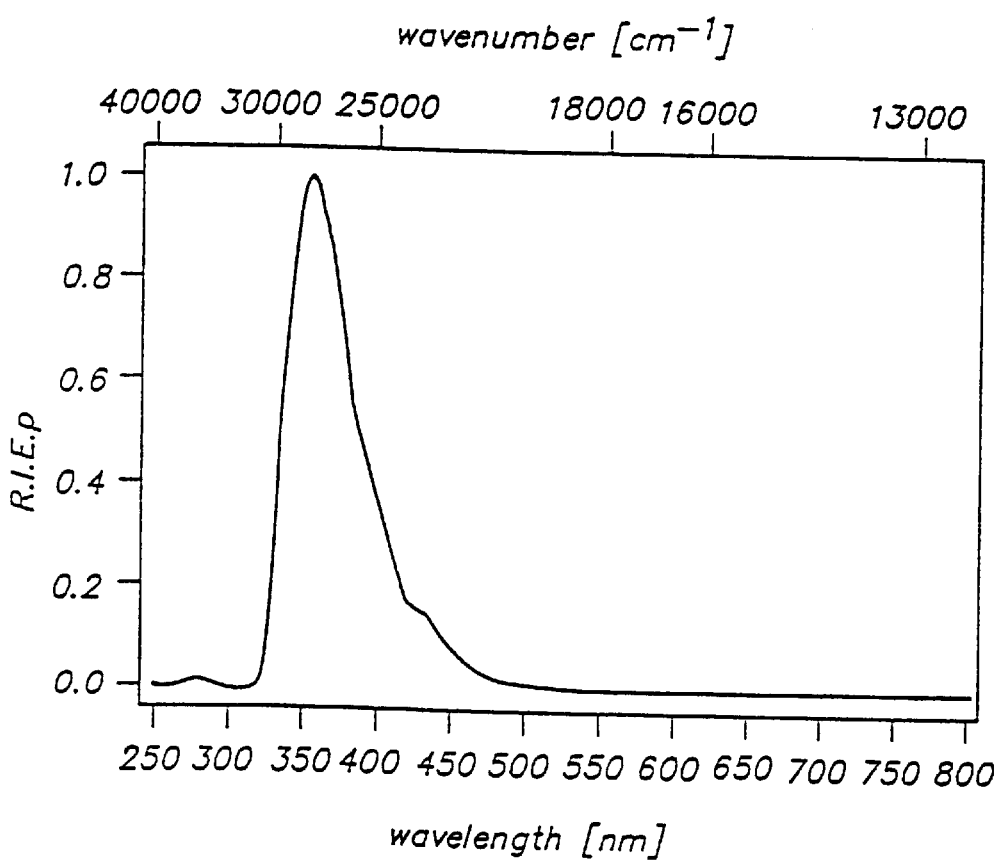
FIG. 2 represents the "prompt" emission spectrum of a compound according to the present invention.
Figure 3:
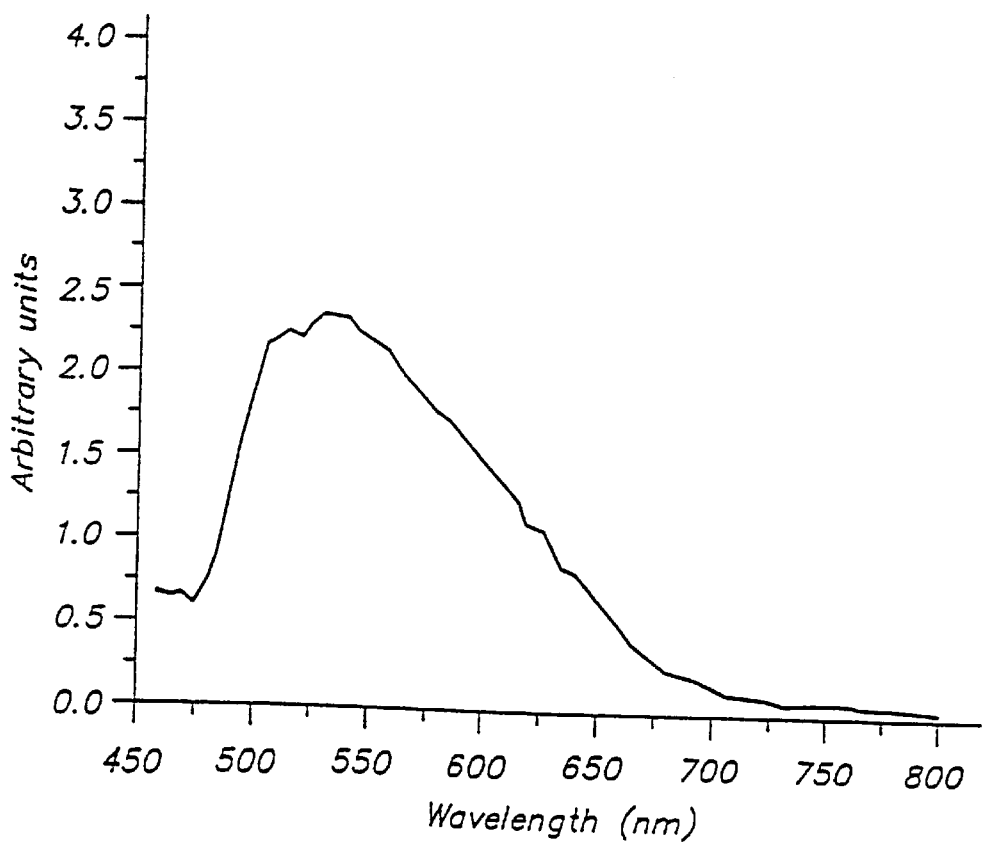
FIG. 3 represents the stimulation spectrum of a compound according to the present invention.

The present invention is illustrated by following example wherein reference is made to curves represented in FIGS. 1 to 3. The example is not limiting in any way. In the example the suffices indicate molar concentrations of the different elements in the compound.

EXAMPLE 1

The Preparation of Phosphor

A single crystal of $Cs_2NaYF_6:Ce^{3+}$ was prepared. 99.999% pure CsF, NaF and $YF_3$ were dried under vacuum and purified by zone refining. After drying and purifying the components were mixed in stoechiometric ratios and 3 mole % of $CeF_3$ was added. This mixture was placed in a carbon crucible and high frequency dried under vacuum at 400° C. for 16 hours.

The single crystal was then grown at 925° C. with a pulling rate of 2 mm/hour. The effective concentration of the dopant $Ce^{3+}$ was measured and was 500 ppm.

The obtained single crystal of the phosphor was crushed to obtain a powdered sample of the phosphor.

In FIG. 1 the X-ray diffraction spectrum (XRD spectrum with $CuK_\alpha$ radiation) of the phosphor powder is shown. In said FIG. 1 peak intensity (P.I.) is plotted against 2×Theta (2 Θ), being the angle in degrees at which the peaks are observed. The straight lines in FIG. 1 are reference lines originating from the XRD spectrum of $Cs_2NaScF_6$.

The powder sample was then dispersed in a binder solution containing polyethylacrylate dissolved in ethyl acetate. The dispersion obtained was coated onto a 100 μm thick transparent sheet of polyethylene terephthalate to give a coating weight of 1000 g/m2.

This screen was used to determine the "prompt" emission spectrum according to measurement A. The result is plotted in FIG. 2. In the diagram the relative intensity of the prompt emission ($R.I.E._p$) is in the ordinate and the wavelength of the "prompt" emitted light in nm is in the abscissa.

This screen was also used to determine the energy storage characteristics of the phosphor in the procedure of measurement B. For this purpose a He—Ne laser (632 nm) as well as a frequency doubled Nd:YAG laser (532 nm) were used. After erasing any residual stored energy by exposure to a quartz-halogen lamp, the screen was irradiated with a given dose of X-rays and then stimulated with either He-Ne laser light (632 nm) or frequency doubled Nd:YAG laser light (532 nm) as described hereinbefore.

The conversion efficiency (C.E.) determined as described hereinbefore and expressed in $pJ/mm^3/mR$ was 12.4 for He-Ne laser stimulation and 15.0 for stimulation with a frequency doubled Nd—YAG laser. The stimulation energy needed to stimulate the screen was 233 $\mu J/mm^2$ for stimulation with the He—Ne laser and 92 $\mu J/mm^2$ for stimulation with the frequency double Nd—YAG laser.

The stimulation spectrum of the obtained phosphor was measured according to the described procedure (measurement D) and is plotted in FIG. 3.

The response time of the phosphor was measured (measurement C) to be about 42 ns.

What is claimed is:

1. A method for recording X-rays comprising the steps of
   i. exposing a recording element comprising an X-ray intensifying screen in combination with a photosensitive material to X-rays,
   ii. recording the light emitted by said X-ray intensifying screen in said photosensitive material, wherein said X-ray intensifying screen comprises an elpasolite phosphor corresponding to the general formula:

$$A_{2-y}B_{1+y}Me^{3+}X_6:xD$$

wherein:
   A is a monovalent metal ion selected from the group consisting of Cs, Rb, K and Tl ions,
   B is a monovalent metal ion selected from the group consisting of Rb, K and Na ions,
   A is different from B
   $r_A > r_B$, $r_A$ representing the ionic radius of monovalent metal ion A, $r_B$ the ionic radius of monovalent metal ion B
   $Me^{3+}$=a trivalent ion
   D is a dopant
   X is at least one of F, Cl, Br and I
   $0 \leq y \leq 1$
   $0 \leq x \leq 0.2$
   and wherein said phosphor has a specific gravity (sg)$\geq 4$.

2. A method according to claim 1, wherein said phosphor has a specific gravity (sg)$\geq 5$.

3. A method according to claim 1, wherein $r_A > r_B > r_{Me}^{3+}$, wherein $r_A$ represents the ionic radius of monovalent metal ion A, $r_B$ the ionic radius of monovalent metal ion B and $r_{Me}^{3+}$ the ionic radius of the trivalent metal ion $Me^{3+}$.

4. A method according to claim 1, wherein $Me^{3+}$ is a member selected from the group consisting of Sc, La, Y, Gd, Tl, In and Bi.

5. A method according to claim 1, wherein X is at least one of F, Br, I.

6. A method according to claim 1, wherein D is a member selected from the group consisting of Sb, Cu, Ce, In, Tl, Na and Eu.

7. A method according to claim 1, wherein D is a member selected from the group consisting of Ce, In, Tl and Eu.

8. A method for recording X-rays comprising the steps of
   i. exposing a photostimulable storage phosphor screen,
   ii. storing the absorbed X-ray energy in said photostimulable phosphor screen,
   iii. stimulating said photostimulable phosphor screen with stimulating radiation to yield a stimulated light output,
   iv. reading said light output wherein said photostimulable phosphor screen comprises an elpasolite phosphor corresponding to the general formula:

$$A_{2-y}B_{1+y}Me^{3+}X_6:xD$$

wherein:
   A is a monovalent metal ion selected from the group consisting of Cs, Rb, K and Tl ions,
   B is a monovalent metal ion selected from the group consisting of Rb, K and Na ions,
   A is different from B
   $r_A > r_B$, $r_A$ representing the ionic radius of monovalent metal ion A, $r_B$ the ionic radius of monovalent metal ion B
   $Me^{3+}$=a trivalent ion
   D is a dopant
   X is at least one of F, Cl, Br and I
   $0 \leq y \leq 1$
   $0 \leq x \leq 0.2$
   and wherein said phosphor has a specific gravity (sg)$\geq 4$.

9. A method according to claim 8, wherein said phosphor has a specific gravity (sg)$\geq 5$.

10. A method according to claim 8, wherein $r_A > r_B > r_{Me}3+$, wherein $R_A$ represents the ionic radius of monovalent metal ion A, $r_B$ the ionic radius of monovalent metal ion B and $r_{Me}3+$ the ionic radius of the trivalent metal ion $Me^{3+}$.

11. A method according to claim 8, wherein $Me^{3+}$ is a member selected from the group consisting of Sc, La, Y, Gd, Tl, In and Bi.

12. A method according to claim 8, wherein X is at least one of F, Br, I.

13. A method according to claim 8, wherein D is a member selected from the group consisting of Sb, Cu, Ce, In, Tl, Na and Eu.

14. A method according to claim 8, wherein D is a member selected from the group consisting of Ce, In, Tl and Eu.

15. A method according to claim 8, wherein said elpasolite phosphor corresponds to the formula $Cs_2NaYF_6:Ce^{3+}$.

* * * * *